United States Patent
Moser et al.

(10) Patent No.: US 7,231,554 B2
(45) Date of Patent: Jun. 12, 2007

(54) TRANSPARENT CONSISTENT ACTIVE REPLICATION OF MULTITHREADED APPLICATION PROGRAMS

(75) Inventors: Louise E. Moser, Santa Barbara, CA (US); Peter M. Melliar-Smith, Santa Barbara, CA (US)

(73) Assignee: Availigent, Inc., San Jose, CA (US)

( * ) Notice: Subject to any disclaimer, the term of this patent is extended or adjusted under 35 U.S.C. 154(b) by 728 days.

(21) Appl. No.: 10/397,038

(22) Filed: Mar. 24, 2003

(65) Prior Publication Data

US 2004/0078617 A1 Apr. 22, 2004

Related U.S. Application Data

(60) Provisional application No. 60/367,615, filed on Mar. 25, 2002, provisional application No. 60/367,616, filed on Mar. 25, 2002.

(51) Int. Cl.
*G06F 11/00* (2006.01)

(52) U.S. Cl. ...................................... 714/38
(58) Field of Classification Search ................ 714/38, 714/51, 50
See application file for complete search history.

(56) References Cited

U.S. PATENT DOCUMENTS

| | | | | |
|---|---|---|---|---|
| 5,577,261 A * | 11/1996 | Harinarayan et al. | ....... | 718/102 |
| 5,630,136 A * | 5/1997 | Davidson et al. | ........... | 718/106 |
| 5,862,376 A * | 1/1999 | Steele et al. | ................. | 718/107 |
| 6,009,269 A * | 12/1999 | Burrows et al. | ............ | 717/130 |
| 6,026,427 A * | 2/2000 | Nishihara et al. | ........... | 718/106 |
| 6,430,638 B1 * | 8/2002 | Kessler et al. | .............. | 710/200 |
| 6,587,955 B1 * | 7/2003 | Foote et al. | ................. | 713/400 |
| 6,606,742 B1 | 8/2003 | Orton et al. | | |
| 6,625,601 B1 * | 9/2003 | Molloy | ......................... | 707/8 |
| 6,662,364 B1 * | 12/2003 | Burrows et al. | ............ | 718/102 |
| 6,782,537 B1 * | 8/2004 | Blackmore et al. | ......... | 719/313 |
| 6,826,752 B1 * | 11/2004 | Thornley et al. | ........... | 718/100 |
| 6,920,634 B1 * | 7/2005 | Tudor | ........................ | 718/107 |
| 6,971,084 B2 * | 11/2005 | Grey et al. | ................. | 717/106 |
| 2002/0078123 A1 * | 6/2002 | Latour | ........................ | 709/104 |
| 2002/0188651 A1 * | 12/2002 | Choi et al. | .................. | 709/107 |
| 2003/0002440 A1 * | 1/2003 | Calvignac et al. | .......... | 370/229 |
| 2005/0034014 A1 * | 2/2005 | Moser et al. | ................. | 714/17 |
| 2005/0177775 A1 * | 8/2005 | Qadeer et al. | ................ | 714/38 |

\* cited by examiner

*Primary Examiner*—Bryce P. Bonzo
(74) *Attorney, Agent, or Firm*—John P. O'Banion

(57) ABSTRACT

A method and system for transparent consistent active replication of multithreaded application programs is described. At each replica, control messages that contain mutex ordering information indicating the order in which threads in the replicas claim mutexes are multicast, and the control messages are delivered using a multicast group communication protocol that delivers the messages in an order that determines the order in which the operating system's thread library grants the claims of mutexes to the threads in the replicas. Because the replicas receive the same messages in the same source order, the corresponding threads in the different replicas are granted their corresponding claims to the corresponding mutexes in the same order, maintaining strong replica consistency.

60 Claims, 6 Drawing Sheets

US 7,231,554 B2

TRANSPARENT CONSISTENT ACTIVE REPLICATION OF MULTITHREADED APPLICATION PROGRAMS

CROSS-REFERENCE TO RELATED APPLICATIONS

This application claims priority from U.S. provisional application Ser. No. 60/367,615 filed on Mar. 25, 2002, incorporated herein by reference, and from U.S. provisional application Ser. No. 60/367,616 filed on Mar. 25, 2002, incorporated herein by reference.

STATEMENT REGARDING FEDERALLY SPONSORED RESEARCH OR DEVELOPMENT

This invention was made with Government support under Grant No. 70NANBOH3015, awarded by the U.S. Department of Commerce, National Institute of Standards and Technology. The Government may have certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to software-based fault-tolerant computer systems and, more particularly, to multi-threaded application programs that are replicated using the egalitarian and competitive active replication strategy.

2. Description of Related Art

Fault-tolerant systems are based on entity redundancy (replication) to mask faults and, thus, to provide continuous service to their users. In software fault tolerance, the entities that are replicated are the application programs or parts thereof (processes, objects or components). A fundamental issue in the design and implementation of fault-tolerant systems is that of maintaining consistency of the states of the replicas.

Distributed systems offer the opportunity for fault tolerance by allowing replicas of the application programs to be hosted on different computers (i.e., in different fault containment regions). In the client-server model of distributed computing, a client invokes a method of a server, typically hosted on a different computer. To render an application fault-tolerant, the server is replicated but the client may also be replicated, particularly in multi-tier applications and in peer-to-peer applications, wherein a process, object or component acts as both a client and a server.

In an active replication strategy, the program code of the replicas is identical and the replicas execute their copies of the code concurrently and, thus, the active replication strategy is an egalitarian strategy. Active replication is based on each of the replicas starting in the same initial state (values of their attributes or variables) and executing the same methods or operations and on strong replica consistency. If there is no non-determinism in the execution of the replicas, it is obvious that they will reach the same state at the end of the execution of each method invocation or operation. The present invention ensures that the replicas generate the same results, even if non-determinism caused by multi-threading is present in the replicas. When the replicas take an action or produce a result that is externally visible, such as sending a message, issuing an input/output command, and so forth, the first such action or result is the one that is used and the corresponding actions or results of the other replicas are either suppressed or discarded. Thus, the active replication strategy is a competitive strategy.

The most challenging aspect of replication is maintaining strong replica consistency, as methods are invoked on the replicas, as the states of the replicas change dynamically, and as faults occur. Strong replica consistency means that, for each method invocation or operation, for each data access within said method invocation or operation, the replicas obtain the same values for the data. Moreover, for each result, message sent or request made to other processes, objects or components, the replicas generate the same result, message or request.

Many application programs written in modern programming languages (such as C++, Java, etc.) involve multi-threading, which is a source of non-determinism. Unless it is properly handled, non-determinism can lead to inconsistency in the states of the replicas. To maintain strong replica consistency, it is necessary to sanitize or mask such sources of non-determinism, i.e., to render the replicated application program virtually deterministic. A virtually deterministic replicated application program is an application program that exists as two or more replicas and that may involve non-deterministic decisions but, for those non-deterministic decisions that affect the state of the replicas at the end of each method invocation, the replicas make the same non-deterministic decisions.

Many fault-tolerant systems based on active replication employ a multicast group communication system. Examples of such a multicast group communication system are Isis (K. P. Birman and R. van Rennesse, Reliable Distributed Computing Using the Isis Toolkit, IEEE Computer Society Press, 1994, incorporated herein by reference) and Totem (L. E. Moser, P. M. Melliar-Smith, D. A. Agarwal, R. K. Budhia and C. A. Lingley-Papadopoulos, Totem: A fault-tolerant multicast group communication system, Communications of the ACM, vol. 39, no. 4, April 1996, pp. 54-63, incorporated herein by reference). Such a multicast group communication system delivers messages reliably and in the same order (linear sequence) to all of the members of the group, i.e., to all of the replicas of the process, object or component.

For replicated unithreaded application programs where the replicas are distributed on multiple computers, a reliable ordered multicast group communication system can be used to maintain strong replica consistency, in the presence of no other sources of non-determinism except the order in which messages are delivered. For multithreaded application programs, the problem of maintaining strong replica consistency is more difficult because two threads in a replica can access a shared resource, typically shared data, in an order different from the order in which the corresponding threads in another replica access their copies of the shared data; consequently, the states of the replicas can diverge and become inconsistent.

For multithreaded application programs, if two threads within a process, object or component share data between them, only one of those threads can access that shared data at a time. Therefore, the shared data must be protected with a mutual exclusion construct, commonly referred to as a mutex, and the thread must be granted the mutex, and enter the critical section of code within which it can access the shared data. When the thread is finished accessing the shared data, it must release the mutex and leave the critical section. To maintain strong replica consistency, the threads in the replicas must be granted the mutexes in the same order, so that they enter the critical sections and access the shared data within the critical section in the same order.

There are several prior patents that address multithreaded application programs. In particular, U.S. Pat. Nos. 5,577,261 and 5,794,043, which are incorporated herein by reference, describe the implementation of process management functions, such as the claim(), release(), suspend() and signal() functions. Operations involving those functions are rendered consistent by having each processor claim a global mutex (called GLUPP) before performing any process management operation. Once it has acquired the global mutex, the process performs the operation and then distributes the results to the other processors before relinquishing the global mutex.

The global mutex, used in those patents, is actually described in U.S. Pat. No. 4,718,002, which is incorporated herein by reference. That patent describes how a mutex can be granted to processors, processes, replicas or threads in a distributed system, but the mechanism requires that one processor should be designated as a distinguished control processor and that the granting of the mutex is determined by that control processor.

U.S. Pat. No. 5,621,885, which is incorporated herein by reference, describes a strategy based on a Primary/Backup approach, in which the Primary replica executes the required operations. When the Primary replica performs an I/O operation, the results of the I/O operation are communicated to the Backup replica, so that the Backup replica performs the same operation as the Primary replica. That strategy requires the replicas to be cast into specific roles of either Primary or Backup replica.

U.S. Pat. Nos. 5,802,265 and 5,968,185, which are incorporated herein by reference, likewise describe a strategy based on a Primary/Backup approach, in which the Primary replica executes the operations required of the computer system. When the Primary replica performs an asynchronous or non-deterministic interaction with the operating system, the results of the interaction with the operating system are communicated to the Backup replica, so that the Backup replica performs the same operation as the Primary replica. Object code editing is the primary mechanism by which the program code is modified and no provisions are made for active replication. U.S. Pat. Nos. 5,802,265 and 5,968,185 are related to the TARGON/32 Fault Tolerance (TFT) system, described below.

The TARGON/32 system (A. Borg, W. Blau, W. Graetsch, F. Herrmann and W. And, Fault tolerance under Unix, ACM Transactions on Computer Systems, vol. 7, no. 1, 1989, pp. 1-24, incorporated herein by reference) describes a fault-tolerant version of the Unix operating system. It is based on special hardware that provides a reliable ordered multicast protocol, but is not applicable to distributed systems. Moreover, that strategy requires a distinguished control processor.

The Delta-4 system (M. Chereque, D. Powell, P. Reynier, J. L. Richier and J. Voiron, Active replication in Delta-4, Proceedings of the IEEE 22nd International Symposium on Fault Tolerant Computing, Boston, Mass., 1992, pp. 28-37 and also D. Powell (ed.), Delta-4: A Generic Architecture for Dependable Distributed Computing, Springer-Verlag, 1991, both of which are incorporated herein by reference) supports active, semi-active and passive replication for application programs, but it does not handle non-determinism (in particular, multithreading) for active replication.

The Hypervisor system (T. C. Bressoud and F. B. Schneider, Hypervisor-based fault tolerance, ACM Transactions on Computer Systems, vol. 14, no. 1, 1996, pp. 80-107, incorporated herein by reference) and the Transparent Fault Tolerance (TFT) system (T. C. Bressoud, TFT: A software system for application-transparent fault tolerance, Proceedings of the IEEE 28th Fault-Tolerant Computing Symposium, Munich, Germany, June 1998, pp. 128-137, incorporated herein by reference) both aim for transparency to the application and the operating system. However, the Hypervisor system uses hardware instruction counters to count the instructions executed between two hardware interrupts and the TFT system uses object code editing to modify the program code. Moreover, both of those systems employ a Primary/Backup approach.

Other researchers (J. H. Sly and E. N. Elnozahy, Supporting non-deterministic execution in fault-tolerant systems, Proceedings of the IEEE 26th Fault Tolerant Computing Symposium, Sendai, Japan, June 1996, pp. 250-259, incorporated herein by reference) have introduced a software instruction counter approach, analogous to the hardware instruction counter approach of the Hypervisor system, to count the number of instructions between non-deterministic events in log-based rollback-recovery systems.

P. Narasimhan, L. E. Moser and P. M. Melliar-Smith, Enforcing determinism for the consistent replication of multithreaded CORBA applications, Proceedings of the 18th IEEE Symposium on Reliable Distributed Systems, Lausanne, Switzerland, October 1999, pp. 263-273, incorporated herein by reference, describes a non-preemptive deterministic scheduler strategy that imposes a single logical thread of control on the replicas to maintain strong replica consistency. That strategy, in effect, undoes the multithreading that was programmed into the application program.

Transactional Drago (S. Arevalo, R. Jimenez-Peris and M. Patino-Martinez, Deterministic scheduling for transactional multithreaded replicas, Proceedings of the IEEE 19th Symposium on Reliable Distributed Systems, Nurnberg, Germany, October 2000, pp. 164-173, incorporated herein by reference) also uses a non-preemptive deterministic scheduler but is aimed at transaction processing systems.

It will be appreciated that strategies, such as detailed in U.S. Pat. Nos. 4,718,002, 5,621,885, 5,802,265 and 5,968,185 described above, require casting replicas into Primary or Backup roles. Furthermore, U.S. Pat. Nos. 5,802,265 and 5,968,185 and the TFT system utilize object code editing to modify the program code and they disclose no mechanisms for active replication.

Therefore, a need exists for a system and method of providing consistent replication of multithreaded applications that is egalitarian and may be transparently implemented. The present invention satisfies those needs, as well as others, and overcomes the deficiencies of previously developed active replication strategies.

BRIEF SUMMARY OF THE INVENTION

The mechanisms of this invention aim to achieve strong replica consistency of multithreaded application programs that are replicated using the egalitarian and competitive active replication strategy. This invention is applicable to distributed systems in which the several computers within the distributed system share no memory and communicate with each other by messages.

An aspect of this invention is to provide mechanisms for fault-tolerant systems based on replication, in which every operation is performed within two or more distinct replicas of an application process, object or component, typically located on different computers within a distributed system. In the event that one of the replicas is disabled by a fault, another replica can continue to provide service.

Another aspect of this invention is to employ active replication, in which every operation is performed by two or more replicas of an application process, object or component, where each of those replicas has the same state, and where the replicas perform the same operations in the same order and thus continue to have the same state, i.e., they maintain strong replica consistency. If one of the replicas is disabled by a fault, another replica continues to provide service without any hiatus, as if no fault occurred. In an active replication strategy, all replicas are equal, and all replicas are treated alike.

There are many sources of nondeterminism in application programs. The mechanisms of this invention address nondeterminism caused by multithreading in replicated application programs that use the active replication strategy. They assume that the application program has been correctly coded so that each resource that is shared by two or more threads is protected by a mutex. They assume further that each thread has a unique thread identifier and that each mutex has a unique mutex identifier.

The mechanisms of this invention ensure that the threads in all of the replicas of an actively replicated multithreaded application program are granted their claims to mutexes, semaphores, and so forth in the same order, even though the threads in the various replicas might claim the mutexes, semaphores, and so forth in different orders. Thus, the mechanisms of this invention eliminate multithreading as a source of nondeterminism in an actively replicated multithreaded application program in order to maintain strong replica consistency.

The invention assumes, and exploits, the reliable ordered message delivery of a multicast group communication protocol to maintain strong replica consistency for an actively replicated multithreaded application program.

Another aspect of this invention is that, at each of the replicas, the mechanisms of the invention multicast special control messages, the PendingClaims messages, that contain mutex ordering information, namely, the order in which the threads in the replicas claim mutexes. The order in which the multicast group communication protocol delivers the PendingClaims messages to the replicas determines the order in which the threads in the replicas are granted the mutexes.

In accordance with another aspect of the invention, to maintain application transparency for replicated multithreaded application programs based on the active replication strategy while maintaining strong replica consistency, the mechanisms of the invention employ the technique of library interpositioning to intercept the calls to functions of the operating system's thread library and to wrap the functions of the operating system's thread library.

One embodiment of the invention comprises a Consistent Multithreading (CMT) library that is interposed ahead of the operating system's thread library, such as the standard POSIX thread (PTHREAD) library. The CMT library contains wrapper functions for the functions of the operating system's thread library that claim and release mutexes, semaphores, condition variables, etc. The application program invokes the wrapper functions of the CMT library, instead of the corresponding functions of the operating system's thread library. The wrapper functions of the CMT library subsequently invoke the corresponding functions of the operating system's thread library. This allows the CMT library to modify the behavior of the replicated multithreaded application program, without modifying either the application program or the functions of the operating system's thread library.

When a replica of the replicated multithreaded program invokes a function to claim a mutex, the CMT claim() function is invoked. The CMT claim() function multicasts a PendingClaims message, to all of the replicas of a process, object or component using the reliable ordered multicast group communication protocol, and subsequently invokes the corresponding function of the operating system's thread library. The multicast protocol delivers messages reliably and in the same order to all of the replicas. If two different threads in a replica both issue a claim for a mutex, the message containing the claim, that the multicast protocol orders and delivers first, determines which thread is granted the mutex first. Consequently, the mechanisms of the invention grant the mutexes in the same order to the threads in all of the replicas. In effect, they sanitize the non-deterministic behavior of the threads in the replicas when they invoke the claim() function of the operating system's thread library and, similarly, for the release() function and for semaphores, control variables, and so forth.

For application programs that run on an operating system that provides Dynamically Linked Libraries (DLL) (e.g., Solaris, Linux, Windows), a command is issued to the DLL mechanisms that causes the DLL mechanisms to interpose the Consistent Multithreading (CMT) library, containing the wrapper functions, ahead of the operating system's thread library. This interpositioning causes the application program to invoke the functions of the CMT library, rather than the corresponding functions of the operating system's thread library directly. In this case, the mechanisms involve no modification or recompilation of the application program and, thus, are transparent to the application program.

If, on the other hand, the operating system does not provide Dynamically Linked Libraries (e.g., VxWorks), it is necessary to insert a statement into the makefile for the application program that directs the linker to include the CMT library ahead of the operating system's thread library. Thus, in this case, the application program is not modified but the makefile is modified.

The mechanisms of this invention allow concurrency of threads that do not simultaneously acquire the same mutex, while maintaining strong replica consistency. Thus, they allow the maximum degree of concurrency possible, while maintaining strong replica consistency.

The mechanisms of this invention sanitize multithreaded application programs in that they mask multithreading as a source of non-determinism so that strong replica consistency is maintained.

The invention may be described in a number of alternative ways, the following being provided by way of example. The invention teaches a system for executing threads in replicas of application programming that are replicated according to the active replication strategy. The system comprises: (1) means for communicating to multiple replicas the claims of shared resources by threads in a replica; and (2) means for ordering shared resource claims to be granted to threads in multiple replicas corresponding to the order in which the shared resource claims were communicated, ordered and delivered through the means for communicating the order of claiming. The shared resources may comprise shared data, code or input/output locations accessible to threads of the replica. By way of example, access to the shared resources may be controlled by mutexes, or similar access control mechanisms.

The means for communicating is configured to multicast messages containing information about which shared resource is being claimed, which thread is claiming the given shared resource, and which shared resource claim request, such as a shared resource claim number, of the thread is being made.

The means for ordering is configured to prevent threads from being granted a shared resource until claim information has been communicated to the replicas by at least one of the replicas. The means for ordering shared resource claims is configured to maintain an identical claim granting order across the replicas, such as according to a routine for selectively granting a resource request with a particular resource claim number, based on the order in which that resource request was communicated, ordered and delivered to the replicas. The means for ordering may comprise at least one allocation routine configured for granting access to shared resources to threads in the replica, in response to information delivered about the order in which threads in the replica and other replicas claim access to shared resources.

A method according to the present invention generally describes executing actively replicated multithreaded application programs containing threads that access shared resources, comprising: (1) issuing a claim request for a shared resource by a thread; (2) multicasting a message to communicate the shared resource claim to all of the replicas of the application program; (3) ordering shared resource claim requests; and (4) granting the shared resource to a given thread in response to the order in which multicast messages are communicated, ordered and delivered, and to the availability of the shared resource.

The invention may be practiced in a number of alternative ways including embodied in an apparatus, system, method, library, software, media containing software programming, and so forth without departing from the teachings of the present invention.

It can be seen, therefore, that the present invention differs from prior strategies in several ways. For example, it will be appreciated that the present invention applies to active replication in which all replicas are equal, whereas strategies such as detailed in U.S. Pat. Nos. 4,718,002, 5,621,885, 5,802,265 and 5,968,185 require casting replicas into Primary or Backup roles. Furthermore, the library interpositioning and wrapping approach of the current invention is distinctly different than utilizing object code editing to modify the program code as is done in U.S. Pat. Nos. 5,802,265 and 5,968,185 and the TFT system where there are no mechanisms for active replication. Note also that the present invention does not require the use of hardware- or software-based instruction counters and thus differs from the strategy such as proposed by J. H Sly and E. N. Elnozahy described previously. Moreover, the current invention does not impose a single logical thread of control on the replicas in order to maintain strong replica consistency, such as Transactional Drago and other systems described above.

Further aspects of the invention will be brought out in the following portions of this document, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Introduction

Figure 1:
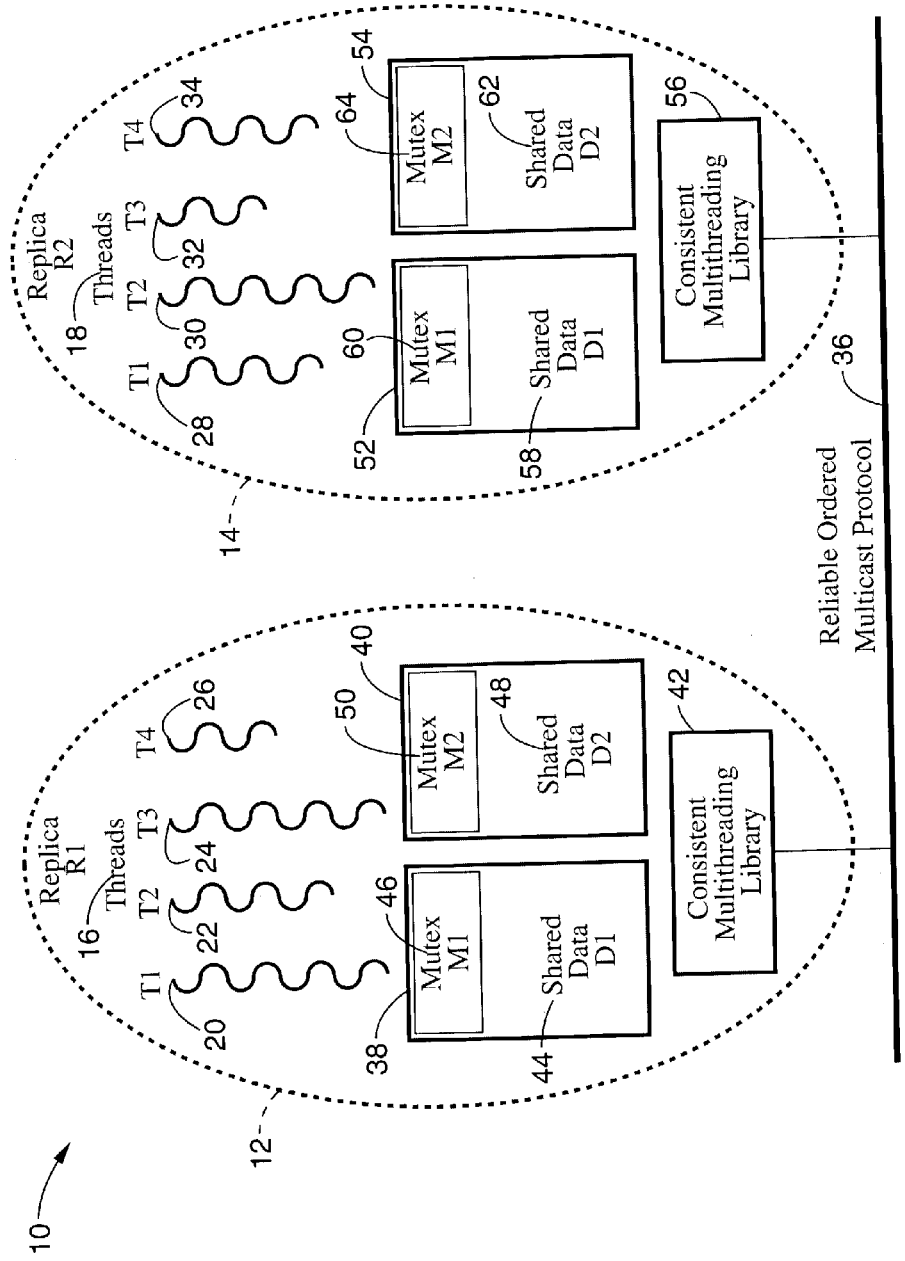
FIG. 1 is a diagram showing two replicas each executing multiple threads that share data, which are protected by mutexes, and where a Consistent Multithreading (CMT) library and a reliable ordered multicast group communication protocol are shown according to an embodiment of the invention.

Referring more specifically to the drawings, for illustrative purposes the present invention is embodied in the processes and systems shown in FIG. 1 through FIG. 6. Those skilled in the art will appreciate that the invention may be implemented in other ways than those shown and described. In the algorithms, diagrams and descriptions, the replicas of the replicated application program may be processes, objects, components or other such entities. The term mutex refers to a binary semaphore. However, the mechanisms of the invention apply equally well to counting semaphores, condition variables, and other shared resource access control mechanisms. The present invention uses known process management functions such as claim(), release(), suspend() and signal() functions. In the methods, diagrams and descriptions below, the code that wraps the functions of the operating system's thread library is referred to as the Consistent Multithreading (CMT) library.

Library Interpositioning

In general terms, the mechanisms of this invention employ a technique of library interpositioning to intercept the calls to functions of the operating system's thread library. For example, for the standard POSIX Thread (PTHREAD) library, the mechanisms intercept the calls to the functions of the PTHREAD library.

In the preferred embodiment of the invention, the Consistent Multithreading (CMT) library contains wrappers for the functions of the operating system's thread library, such as the pthread_mutex_lock() and pthread_mutex_unlock() functions of the PTHREAD library. Because the mechanisms of this invention apply to threading libraries other than the PTHREAD library, we refer to these methods, and the corresponding wrapper functions, more generally as claim() and release(), respectively.

When a thread of a replica claims a mutex, the thread actually invokes the claim() function of the CMT library, instead of the claim() function of the operating system's thread library. The CMT claim() function subsequently invokes the claim() function of the operating system's thread library. However, before doing so, the CMT claim() function takes appropriate steps, described below, to ensure that the threads in the different replicas claim the mutexes in the same order.

The CMT mechanisms multicast a PendingClaims message containing a sequence of (T, M, N) identifier triples (the mutex ordering information), where thread T of a replica has claimed mutex M and this claim is T's Nth claim of any mutex. Thread T of a replica is not granted its claim of mutex M until the reliable ordered multicast protocol orders and delivers the message containing the mutex ordering information (T, M, N) to the replicas. The reliable ordered multicast protocol guarantees that the message delivery order of the PendingClaims messages is the same at all of the replicas.

For each mutex M, the CMT mechanisms maintain a Boolean variable, M.available, which indicates whether or not mutex M is available. For each thread T, the CMT mechanisms maintain a Boolean variable, T.suspended, which indicates whether or not thread T is suspended. For each thread T, the CMT mechanisms maintain an integer variable T.granted which is set to N, where the claim being granted is T's Nth claim of any mutex.

The CMT mechanisms at each replica maintain a queue, the PendingClaims queue, of outstanding (T, M, N) triples, where thread T has claimed mutex M and this claim is T's Nth claim of any mutex. The PendingClaims queue spans different threads, different mutexes and different claims of the different mutexes by the different threads. As the threads claim the mutexes, the CMT mechanisms intercept the calls to the operating system's claim() function and append the (T, M, N) triples to the PendingClaims queue.

The CMT mechanisms at each replica multicast a special control message, the PendingClaims message, that contains information about the order in which the threads in that replica claim mutexes. The order in which messages are delivered determines the order in which the threads are granted mutexes. For example, if a PendingClaims message from one replica contains (T, M, N) and a PendingClaims message from another replica contains (T', M, N'), then the first such message ordered and delivered determines whether thread T or thread T' is granted the mutex M first.

For each mutex M, the CMT mechanisms at each replica maintain a queue, the M.orderedClaims queue, of claims that have been ordered and delivered. The entries of the M.orderedClaims queue occur in the order in which the claims of the different threads for the mutex M are granted. The CMT mechanisms grant, to the threads, the mutexes that they claim based on the order in which those claims occur in the M.orderedClaims queue, rather than on the order in which the threads are suspended, or on the order determined by the operating system scheduler on the local computer.

Two Multithreaded Replicas with the Interposed CMT Library

Referring now to FIG. 1, two multithreaded replicas, R1 and R2, are shown 10, each executing in its own process 12, 14 respectively. A reliable ordered multicast group communication protocol 36 conveys messages to replicas R1 and R2 and delivers the messages reliably and in the same order (linear sequence) to both of the replicas.

In the example shown, there are two sets of threads 16, 18 associated with replica R1 and replica R2, respectively. In replica R1, the thread set 16 comprises four threads T1-T4 that are designated as 20-26, respectively. Thread T1 20 and thread T2 22 access the shared resource 38 comprising shared data D1 44 using mutex M1 46. Thread T3 24 and thread T4 26 access the shared resource 40 comprising shared data D2 48 using mutex M2 50. The CMT library 42 is interposed between replica R1 and the operating system's thread library, and is dynamically or statically linked into replica R1.

Similarly, in replica R2, the thread set 18 comprises four threads T1-T4 that are designated as 28-34, respectively. Thread T1 28 and thread T2 30 access the shared resource 52 comprising the shared data D1 58 using mutex M1 60. Thread T3 32 and thread T4 34 access the shared resource 54 comprising shared data D2 62 using mutex M2 64. The CMT library 56 is interposed between replica R2 and the operating system's thread library, and is dynamically or statically linked into replica R2.

In replica R1, because thread T1 20 and thread T2 22 can each read and write the shared data D1 44, their access to that data is protected by mutex M1 46. Similarly, thread T3 24 and thread T4 26 can each read and write the shared data D2 48, to which access is protected by mutex M2 50. However, threads T1 20 and T2 22 share no data with threads T3 24 and T4 26; thus, threads T1 20 and T2 22 can execute concurrently with threads T3 24 and T4 24 without the need for a mutex. The same is true for the corresponding threads in replica R2.

EXAMPLE OF THE CMT MECHANISMS

Figure 2:
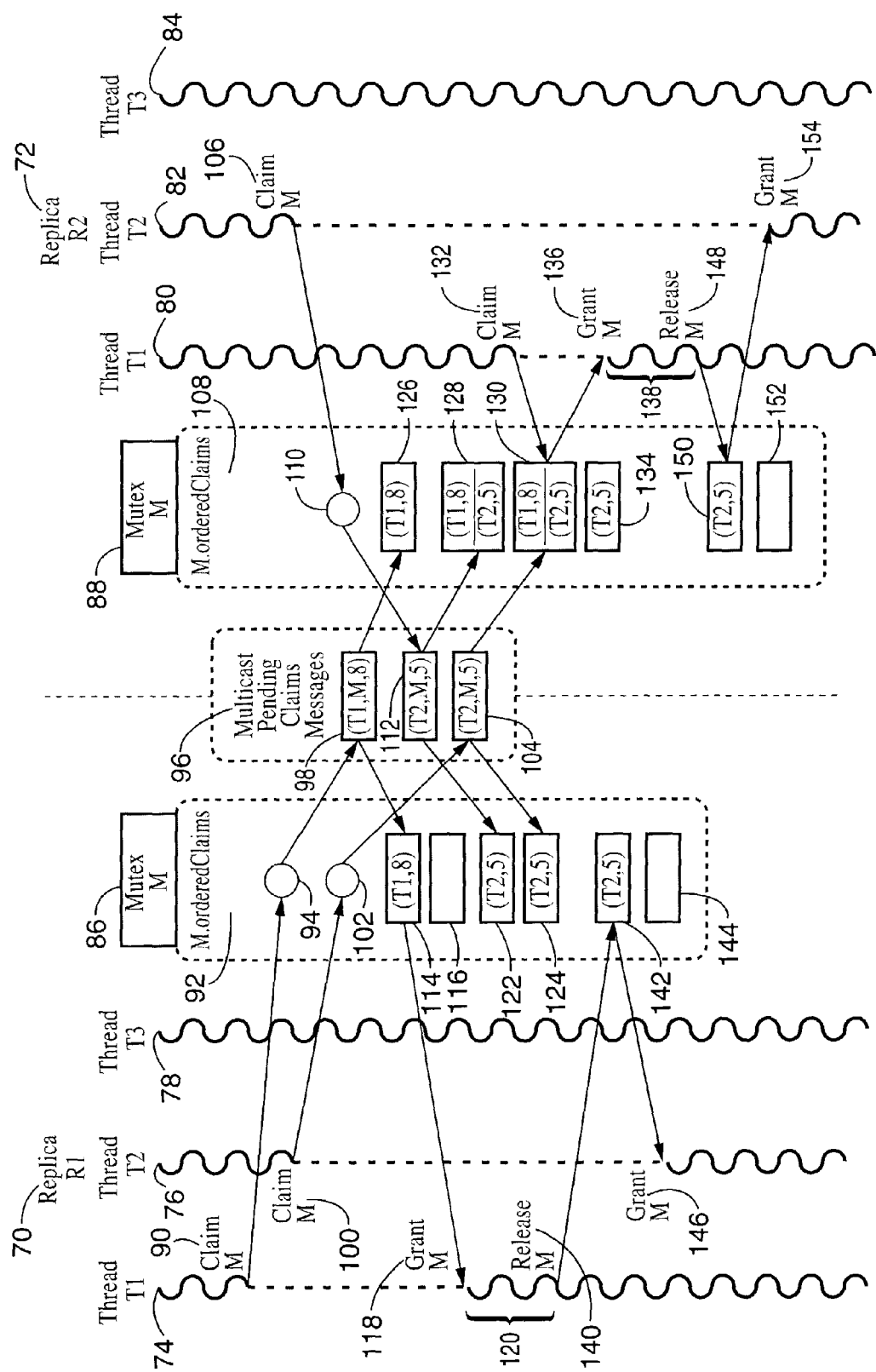
FIG. 2 is a process flow diagram showing two replicas each executing multiple threads, with a history of the order in which mutexes are claimed, granted and released, and in which PendingClaims messages are multicast according to an embodiment of the invention.

FIG. 2 represents a scenario that involves two replicas R1 70 and R2 72 which are each executing multiple threads T1 74, T2 76, T3 78 and T1 80, T2 82, T3 84, respectively. In typical scenarios, the replicas comprise two or more replicas of a process, object or component hosted on two or more computers within a distributed computing environment. The scenario shows a history of the order in which mutexes are claimed, granted and released, using the mechanisms of the CMT library, according to an aspect of the present invention. The mutexes are controlled by the CMT library functions, instead of only by the corresponding functions of the operating system's thread library, in order to maintain strong replica consistency.

The CMT mechanisms communicate pending claims for mutexes to multiple replicas, such as according to the use of multicast messages. The means for communicating the mutex operations are generally provided by way of PendingClaims messages that are multicast to the replicas, according to an aspect of the present invention.

Each thread is shown as a sequence of instruction executions, which include access to shared data. The M.ordered- Claims queue for mutex M, associated with the shared data, is shown in the figure at specific times, such as when a claim for mutex M is ordered, delivered and placed in the M.orderedClaims queue, or when a claim for mutex M is granted and removed from the queue.

It should be appreciated that the figure represents a simple case for clarity, while numerous claims for mutex M may be pending for a number of threads, wherein the M.orderedClaims queue could contain many entries. Additionally, the reliable ordered multicast messages are shown by way of example as a small sequence of multicast messages, although many messages may additionally be multicast.

Referring to the figure, replica R1 70 is shown by way of example executing threads T1 74, T2 76 and T3 78, and replica R2 72 is shown by way of example executing threads T1 80, T2 µand T3 84. Threads T1 74 and T2 76 of replica R1 access shared data via mutex M 86. Thread T3 78 does not share data with thread T1 74 or thread T2 76, and consequently it executes concurrently with these threads without the need for a mutex. Similarly, threads T1 80 and T2 µin replica R2 access the shared data via mutex M 88. Thread T3 84 does not share data with thread T1 80 or thread T2 µand as a result executes concurrently with these threads without the need for a mutex.

When thread T1 74 in replica R1 70 invokes the CMT claim() function to claim 90 mutex M 86 the CMT claim() function checks whether its M.orderedClaims queue 92 already contains a claim 94 for mutex M by thread T1. In this case, the M.orderedClaims queue 92 does not currently contain such a claim, wherein the CMT claim() function thereby multicasts 96 a PendingClaims message containing the claim (T1, M, 8) 98 and suspends thread T1 74.

Similarly, when thread T2 76 in replica R1 70 invokes the CMT claim() function to claim 102 mutex M 86, the CMT claim() function checks whether the M.orderedClaims queue 92 already contains a claim 102 for mutex M by thread T2. As the M.orderedClaims queue 92 does not currently contain such a claim, the CMT claim() function multicasts 96 a PendingClaims message containing the claim (T2, M, 5) 104 and suspends thread T2 76.

Concurrently, in replica R2 72, when thread T2 µinvokes the CMT claim() function to claim 106 mutex M, the CMT claim() function checks whether its M.orderedClaims queue 108 already contains the claim (T2, 5) 110. As the M.orderedClaims queue 108 does not currently contain such a claim, the CMT claim() function multicasts a PendingClaims message containing the claim (T2, M, 5) 112, and suspends thread T2 82.

When replica R1 70 receives a PendingClaims message that contains a claim (T1, M, 8), the CMT message handler extracts the claim (T1, 8) and checks whether its M.orderedClaims queue 92 already contains the claim (T1, 8). As its M.orderedClaims queue does not contain the claim (T1, 8), the CMT message handler places that claim in the M.orderedClaims queue which then contains only the claim (T1, 8) 114. Because thread T1 74 is currently suspended waiting for mutex M 86 as a result of its previous claim (T1, 8) 90, and because no thread currently holds mutex M, the CMT mechanisms awaken thread T1 74 in replica R1 70.

When thread T1 74 in replica R1 70 awakens, the CMT claim() function checks whether (T1, 8) is the first entry in its M.orderedClaims queue 92. As (T1, 8) is the first entry 114 in the M.orderedClaims queue, the CMT claim() function removes claim (T1, 8) from that queue, which then becomes empty 116, and grants 118 mutex M to thread T1 74, thereby allowing thread T1 to enter the critical section 120 and access the shared data.

In replica R2 72, it should be noted that thread T2 82, instead of thread T1 80, claims mutex M first. That order is inconsistent with the order in replica R1, where thread T1 claimed, and was granted, the mutex first. The CMT library, as an embodiment of this invention, enforces consistent ordering of mutex claims and claim releases which, in this scenario, means that thread T2 in replica R2 will not be granted its claim to mutex M until thread T1 in replica R2 is granted its claim to mutex M.

When replica R1 70 receives the PendingClaims message containing pending claim (T2, M, 5), which replica R2 72 generated as a consequence of thread T2 claiming 104 mutex M, and which the multicast protocol ordered and delivered to replica R1, the CMT message handler at replica R1 checks whether its M.orderedClaims queue 92 already contains the claim (T2, 5). Because the M.orderedClaims queue does not contain that claim, the CMT message handler at replica R1 appends the claim (T2, 5) to the empty M.orderedClaims queue 116, which then contains one entry 122. However, thread T1 74 of replica R1 70 already holds mutex M 86; therefore, the CMT mechanisms do not awaken thread T2 76 of replica R1.

When replica R1 70 receives the PendingClaim message containing the claim (T2, M, 5) 104, based on replica R1's claim (T2, 5) 102, the CMT message handler checks whether the M.orderedClaims queue 92 already contains claim (T2, 5). Because claim (T2, 5) is already contained in the M.orderedClaims queue 122, the CMT message handler discards the PendingClaims message containing claim (T2, 5), because it is a duplicate, wherein the M.orderedClaims queue 124 is identical to the prior M.orderedClaims queue 122.

When replica R2 72 receives a PendingClaims message containing the claim (T1, M, 8) 98 from replica R1 70, the CMT message handler at replica R2 checks whether the claim (T1, 8) is already in its M.orderedClaims queue 108. As claim (T1, 8) is not in its M.orderedClaims queue, the CMT message handler appends claim (T1, 8) to that queue, which now contains one entry (T1, 8) 126. As the thread T1 80 in replica R2 72 is not suspended, the CMT mechanisms do not awaken thread T1.

When replica R2 72 receives the PendingClaims message containing claim (T2, M, 5) 112 that replica R2 multicast and that the multicast protocol ordered and delivered, the CMT message handler at replica R2 checks whether the claim (T2, 5) is already in its M.orderedClaims queue 108. Because the claim (T2, 5) is not in its M.orderedClaims queue, the CMT message handler at replica R2 appends (T2, 5) to its M.orderedClaims queue, which then contains two entries 128. As the claim (T2, 5) is not the first entry in the M.orderedClaims queue at replica R2 72, the CMT mechanisms at replica R2 do not awaken thread T2 82.

When replica R2 72 receives the PendingClaims message containing the claim (T2, M, 5) 104 that replica R1 70 multicast and that the multicast protocol ordered and delivered, the CMT message handler at replica R2 checks whether the claim (T2, 5) is already in its M.orderedClaims queue 108. Because (T2, 5) is already in its M.orderedClaims queue, the CMT message handler at replica R2 discards that claim as a duplicate, wherein its M.orderedClaims queue 130 is the same as its M.orderedClaims queue at 128.

When thread T1 80 in replica R2 72 invokes the CMT claim() function to claim 132 mutex M, the CMT claim() function checks whether the claim (T1, 8) is already in its M.orderedClaims queue. Because the claim (T1, 8) is already in its M.orderedClaim queue 130, the CMT claim()

function discards the duplicate claim and does not multicast it. Because no thread in replica R2 72 is currently holding mutex M 88, the CMT claim() function removes the claim (T1, 8) from the M.orderedClaims queue, which then contains one entry (T2, 5) 134, and grants 136 mutex M to thread T1. It then returns, allowing thread T1 80 to execute the critical section 138 of code in which it accesses the shared data that mutex M protects.

In replica R1 70, when thread T1 74 has finished accessing the shared data protected by mutex M 86 and invokes the release function, the CMT release() function 140 is invoked. The CMT release() function marks mutex M as available, and checks whether another thread is currently waiting for that mutex. Because the first entry in its M.orderedClaims queue currently contains the claim (T2, 5) 145, the CMT release() function determines that thread T2 76 is waiting for mutex M 86. The CMT release() function then awakens thread T2 76 and returns execution to thread T1 74 allowing it to proceed.

When thread T2 76 in replica R1 70 awakens, the CMT claim() function removes the claim (T2, 5) from its M.orderedClaims queue, which then becomes empty 144 and grants mutex M to thread T2 146 and returns, thereby allowing thread T2 76 to proceed.

In replica R2 72, when thread T1 80 has finished accessing the shared data protected by mutex M and invokes the release function to release mutex M, the CMT release() function 148 is invoked. The CMT release() function marks mutex M 88 as available, and checks whether another thread is waiting for that mutex. As the M.orderedClaims queue 108 contains the claim (T2, 5) 150, which indicates that thread T2 µis waiting for mutex M, the CMT release() function then awakens thread T2. The CMT release() function then returns execution to thread T1 80, allowing T1 to proceed.

When thread T2 µin replica R2 72 awakens, the CMT claim() function checks whether the claim (T2, 5) is the first entry 150 in its M.orderedClaims queue. As (T2, 5) is the first entry in its M.orderedClaims queue, the CMT claim() function removes the claim (T2, 5) from that queue, which then becomes empty 152. The CMT claim() function then grants 154 mutex M to thread T2 µin replica R2 72 and returns, thereby allowing thread T2 to proceed.

Replica Thread Invokes CMT Claim() Function to Claim a Mutex

At a replica, when thread T invokes the claim function to claim mutex M, it actually invokes the CMT claim() function. The CMT claim() function then executes the following steps:

--- determine (T, M, N)
if (T, N) is the first entry in the M.orderedClaims queue
   remove (T, N) from the M.orderedClaims queue
   set T.granted to N
   set M.available to false
   grant M to T
else
   if (T, N) does not occur anywhere in the M.orderedClaims queue
      append (T, M, N) to the PendingClaims queue of claims to be multicast
set T.suspended to true
suspend T

---

Figure 3:
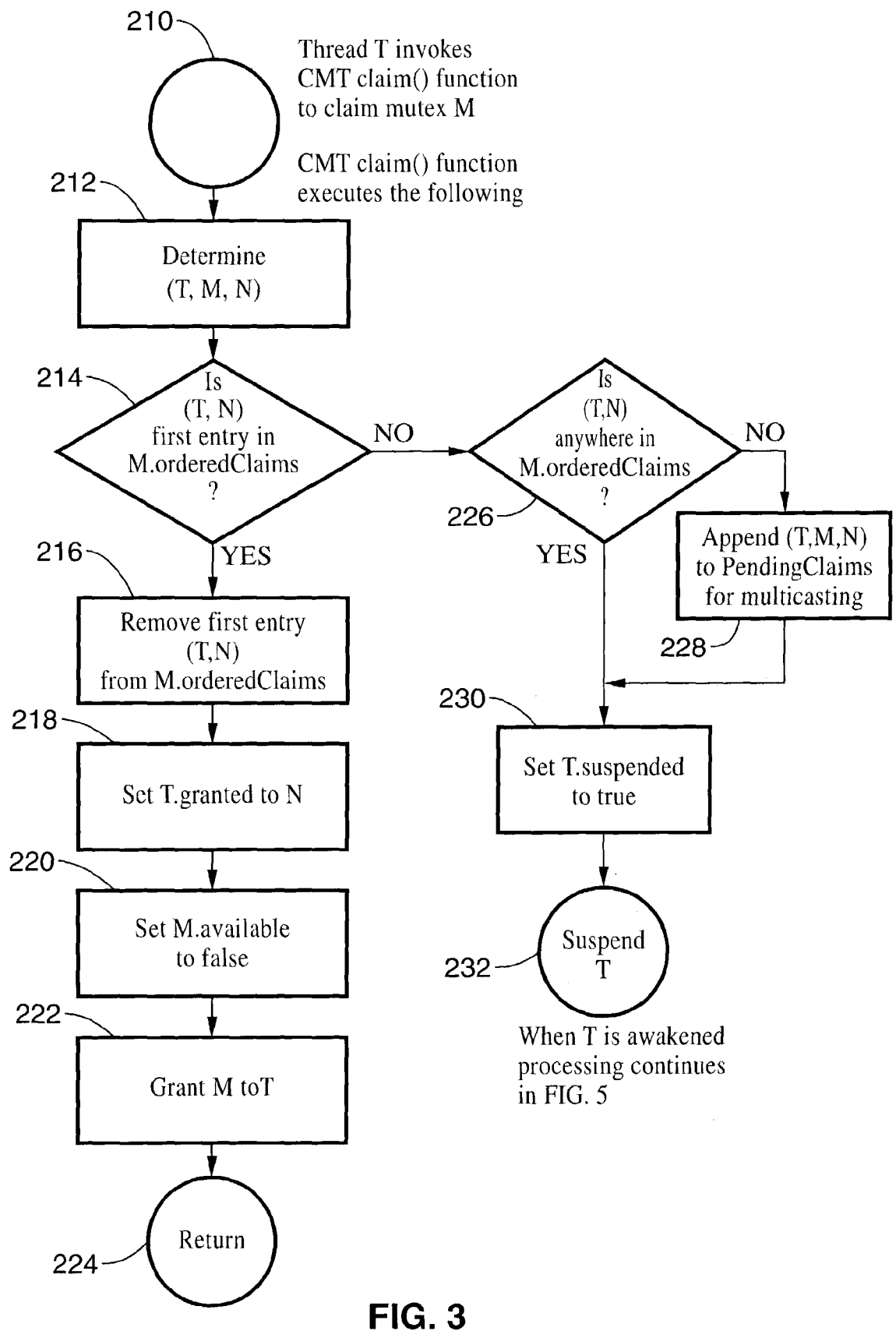
FIG. 3 is a flow chart that shows a thread of a replica invoking the CMT claim() function for a mutex and the steps taken by that function when it is invoked according to an embodiment of the invention.

Thus, referring to FIG. 3, at a replica, when thread T invokes the CMT claim() function to claim mutex M and this claim is T's Nth claim of any mutex at block 210, the CMT claim() function first determines the triple (T, M, N) at block 212.

It then checks whether the pair (T, N) is the first entry in the M.orderedClaims queue at block 214. If the pair (T, N) is the first entry in that queue, the CMT claim() function then removes (T, N) from that queue at block 216, sets T.granted to N at block 218, sets M.available to false at block 220, grants M to T at block 222 and then returns at block 224.

If at block 214 the pair (T, N) is not the first entry in the M.orderedClaims queue, the CMT claim() function checks whether the pair (T, N) occurs anywhere in the M.orderedClaims queue at block 226. If the pair (T, N) does not occur in that queue, the CMT claim() function appends (T, M, N) to the PendingClaims queue of claims to be multicast at block 228. In either case, it then sets T.suspended to true at block 230 and suspends thread T at block 232.

Periodically, or immediately when the CMT mechanisms add an entry to the PendingClaims queue, the CMT mechanisms multicast a PendingClaims message containing the entries of the PendingClaims queue, as shown at 96 in FIG. 2.

Replica Multicasts a PendingClaims Message

Periodically, or immediately when an entry is added to the PendingClaims queue, the CMT mechanisms at each replica multicast a PendingClaims message, as shown at 98, 112 and 104 in FIG. 2.

Replica Thread Invokes CMT Release() Function to Release a Mutex

When a thread T in a replica invokes the release function to release mutex M, it actually invokes the CMT release() function. The CMT release() function executes the following steps:

--- set M.available to true
if the M.orderedClaims queue is not empty
   determine the first entry (T', N') in the M.orderedClaims queue
   if T'.suspended
      signal T' to awaken it

---

Figure 4:
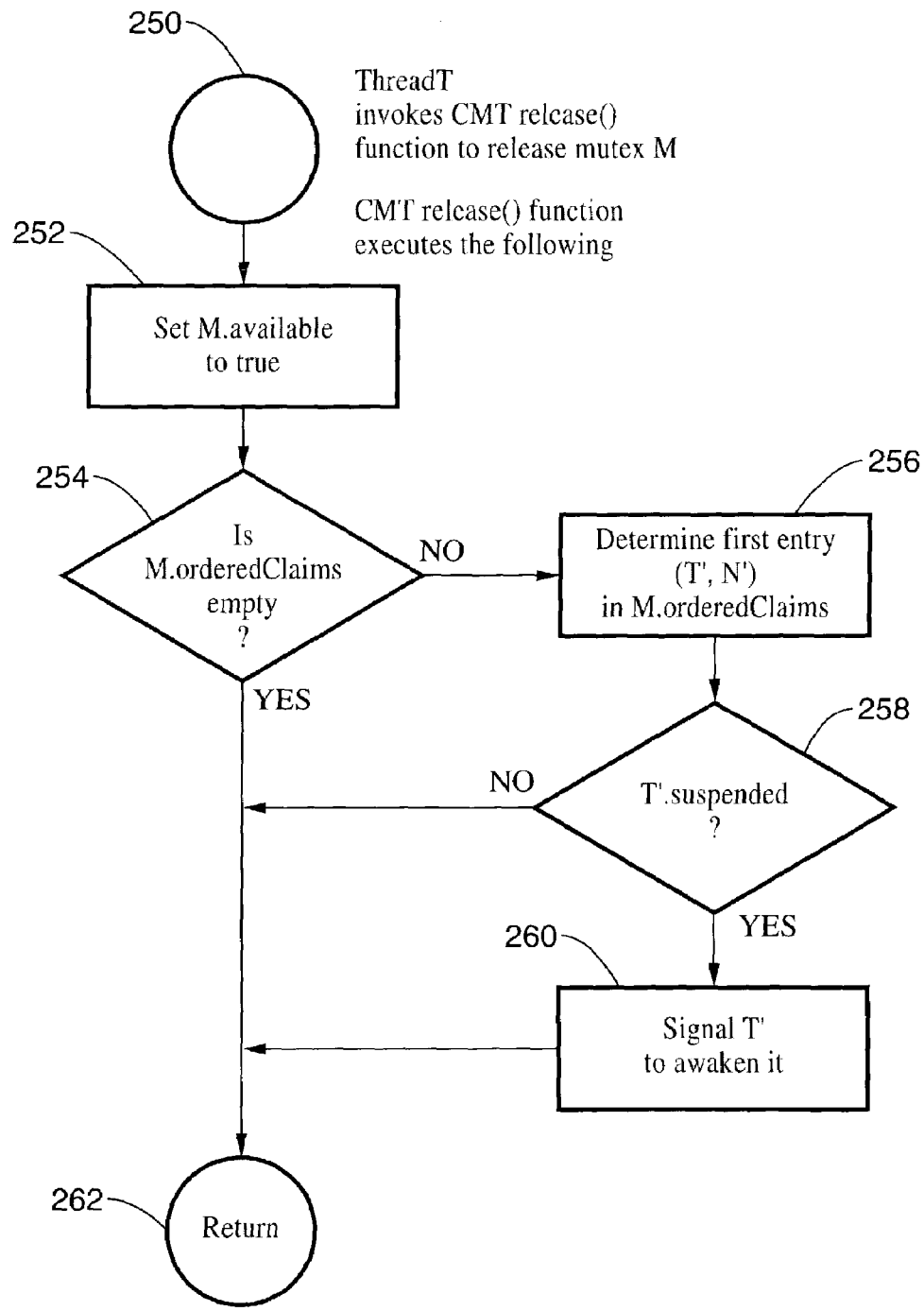
FIG. 4 is a flow chart that shows a thread of a replica invoking the CMT release() function for a mutex and the steps taken by that function when it is invoked according to an embodiment of the invention.

Thus, referring to FIG. 4, when a thread T invokes the CMT release() function to release mutex M at block 250, first the CMT release() function sets M.available to true at block 252 and then it checks whether the M.orderedClaims queue is empty. If the M.orderedClaims queue is not empty, it determines the first entry (T', N') in the M.orderedClaims queue at block 256 and then checks whether T'.suspended is true at block 258. If T' is suspended, the CMT release() function signals T' to awaken it at block 260 and then returns at block 262. Otherwise, if T' is not suspended or if the M.orderedClaims queue is empty, the CMT release() function simply returns at block 262.

Replica Thread is Awakened

When a thread T is awakened while waiting for mutex M as its Nth claim of any mutex, the CMT claim() function executes the following steps:

--- if (T, N) is the first entry in the M.orderedClaims queue
   remove (T, N) from the M.orderedClaims queue
   set T.granted to N -continued

```
        set M.available to false
        grant M to T
    else
        suspend T
```

Figure 5:
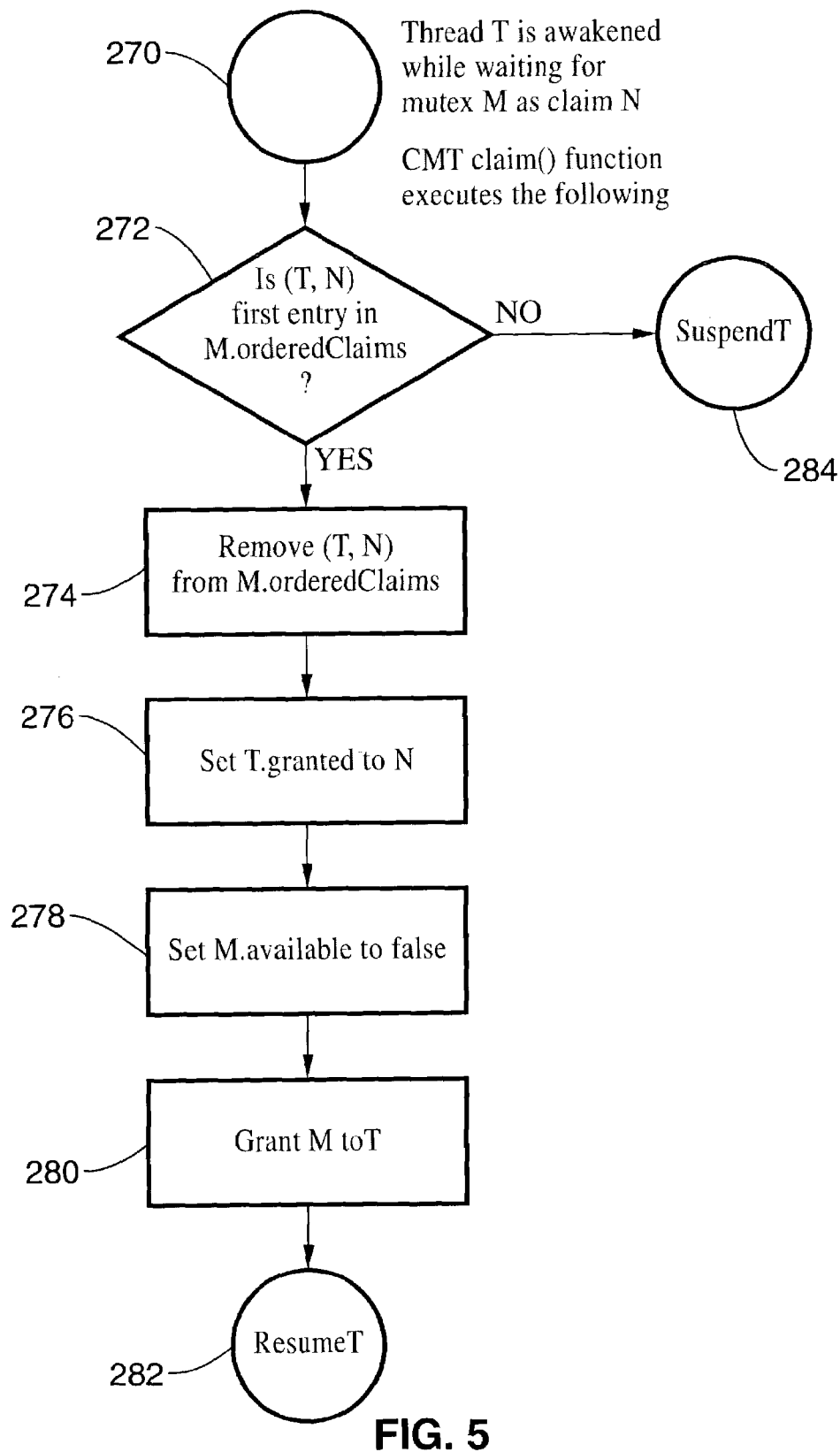
FIG. 5 is a flow chart that shows a replica receiving a PendingClaims message and the steps taken by the CMT message handler when it receives that message according to an embodiment of the invention.

Thus, referring to FIG. 5, when a thread T is awakened while waiting for mutex M as its Nth claim of any mutex at block 270, the CMT claim() function checks whether (T, N) is the first entry in the M.orderedClaims queue at block 272. If so, the CMT claim() function removes (T, N) from the M.orderedClaims queue at block 274, sets T.granted to N at block 276 which records T's Nth claim as having been granted, sets M.available to false at block 278 and grants M to T at block 280, and then resumes T at block 282. If (T, N) is not the first entry in the M.orderedClaims queue, the CMT claim() function suspends T at block 284.

Replica Receives a PendingClaims Message

When the CMT message handler at a replica receives a PendingClaims message containing the mutex ordering information, it extracts that information. For each entry (T, M, N) extracted from the PendingClaims message, the CMT message handler performs the following steps:

```
if (T, N) is not in the M.orderedClaims queue and if N > T.granted
    (i.e., T's Nth claim of a mutex has not been granted)
    append (T, N) to the M.orderedClaims queue
    if M.available and T.suspended
        signal T to awaken it
```

Figure 6:
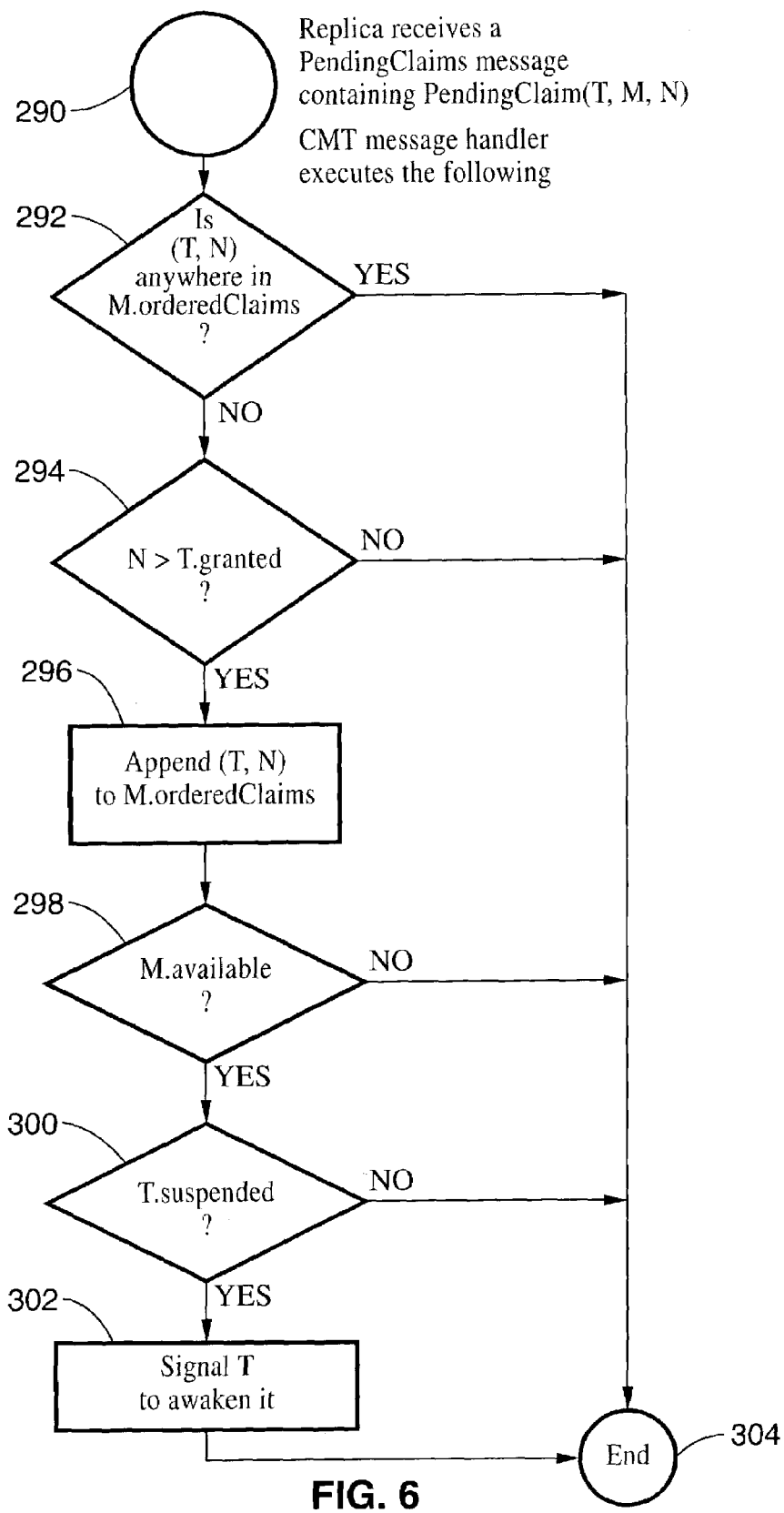
FIG. 6 is a flow chart that shows a thread of a replica that is awakened while waiting for a mutex and the steps taken by the CMT claim() function according to an embodiment of the invention.

Thus, referring to FIG. 6, when a replica receives a PendingClaims message that contains the mutex ordering information at block 290, it extracts that information. For each entry (T, M, N) extracted from the PendingClaims message, the replica checks whether (T, N) is anywhere in its M.orderedClaims queue at block 292. If (T, N) is not in the M.orderedClaims queue and if N>T.granted (i.e., T's Nth claim has not already been granted) at block 294, the CMT message handler appends (T, N) to the M.orderedClaims queue at block 296. It then checks whether M is available at block 298 and T is suspended at block 300. If so, it signals T to awaken it at block 302 and then terminates at block 304. In all other cases, it simply terminates at block 304.

As can be seen, therefore, the present invention comprises a method and system for transparent consistent active replication of multithreaded application programs wherein multithreading is sanitized or masked in a transparent manner by intercepting calls to functions, such as functions of a Consistent Multithreading library (CMT), that claim and release mutual exclusion constructs, or similar access control structures. When a thread of a replica of the application program claims or releases a mutual exclusion construct that protects a shared resource, it actually invokes the claim function of the CMT library that wraps the corresponding function of the operating system's thread library. The claim function of the CMT library multicasts a message, containing the claim for the mutual exclusion construct, to all replicas. The order in which the claim for the mutual exclusion construct is granted to a thread in a replica is determined competitively by the order in which the multicast messages, containing claim information for the mutual exclusion construct, are communicated and delivered to that replica. Because the replicas receive the same messages in the same source order, the corresponding threads in the different replicas are granted their corresponding claims to the corresponding mutual exclusion constructs in the same order, maintaining strong replica consistency.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for executing threads in replicas of an application program within a computing environment, using the active replication strategy, in which resources are shared between threads in a replica, wherein said shared resources comprise either data or code sections for manipulating said data, comprising:

means for communicating to multiple replicas the claims of shared resources by threads in a replica; and means for ordering shared resource claims to be granted to threads in multiple replicas corresponding to the order in which claims for the resources were communicated, ordered and delivered through said means for communicating the order of claiming;

wherein a thread within a replica is suspended upon claiming a shared resource until said claim is communicated to all of said replicas; and wherein said thread suspension is suppressed if said shared resource claim has already been communicated to all of the replicas.

2. A system as recited in claim 1, wherein said means for ordering resource claims is configured to prevent threads from being granted a shared resource until claim information has been communicated to the replicas by at least one of said replicas.

3. A system as recited in claim 2, wherein each said replica is configured to order shared resource claims in response to the order of arrival of said shared resource claim information communicated to said replicas.

4. A system as recited in claim 3, wherein said shared resource claim information is communicated by multicasting a message to said replicas.

5. A system as recited in claim 4, wherein shared resource claim granting is configured to maintain an identical claim granting order across said replicas.

6. A system as recited in claim 1, wherein said means for communicating to multiple replicas comprises a means for simultaneously communicating shared resource claim information from a thread in a given replica to all of the replicas.

7. A system as recited in claim 6, wherein said means for simultaneously communicating shared resource claims comprises the multicasting of messages to said replicas.

8. A system as recited in claim 7, wherein said multicast messages contain information about which shared resource is being claimed, which thread is claiming the given shared resource, and which shared resource claim request of said thread is being made.

9. A system as recited in claim 8, wherein said information of which shared resource claim request of said thread is being made comprises a shared resource claim number.

10. A system as recited in claim 1, wherein said means for ordering shared resource claims comprises a routine for selectively granting a resource request, with a particular resource claim number, based on the order in which that resource request was communicated, ordered and delivered to the replicas.

11. A system as recited in claim 1, wherein said means of ordering shared resource claims controls access to a mutual exclusion construct (mutex) through which access to said shared resource is controlled.

12. A system as recited in claim 11, wherein access to said shared resource is controlled by multicasting a message to said replicas.

13. A system as recited in claim 12, wherein said message being multicast comprises elements that identify a shared resource, a thread wanting to access said shared resource, and the thread's resource claim number.

14. A system as recited in claim 1,
wherein said means for communicating and said means of ordering are configured to transparently execute within said system;
wherein said transparent execution is provided in application replicas without modifying the application code.

15. A system as recited in claim 14, wherein said transparent execution comprises executing functions of a consistent multithreading library for said replicas that do not require the application program code to be modified to perform said means for communicating, and said means for ordering.

16. A system as recited in claim 1, further comprising means for communicating pending claims for shared resources to the replicas.

17. A system as recited in claim 16, wherein said means for communicating pending claims for shared resources comprises multicasting a message to all of the replicas.

18. A system as recited in claim 17, wherein said message comprises information about the order in which the threads claim said shared resource.

19. A system as recited in claim 1, wherein said means for ordering shared resource claims in which each corresponding shared resource in a replica maintains identical ordering of corresponding accesses to that shared resource for the corresponding threads in that replica.

20. A system as recited in claim 19, wherein said resource claim information for a particular thread is recorded in an ordered claims queue in the order in which said claims are to be fulfilled.

21. A system as recited in claim 1, wherein said means for communicating, and said means for ordering, are configured as a set of functions of a consistent multithreading library that are executed in response to selected calls to functions of the operating system's thread library.

22. A system as recited in claim 21, wherein said set of functions are configured to intercept calls to select functions within the operating system's thread library.

23. A system as recited in claim 22, wherein said set of functions are dynamically linked into the replicas of said program.

24. A system as recited in claim 23, wherein said set of functions are configured for claiming or releasing a shared resource in a virtually deterministic manner in which identical threads in separate replicas are granted resource access in an identical order.

25. A system as recited in claim 23, wherein said functions of the consistent multithreading library are configured to maintain replica consistency without the need to modify object code, impose single threaded execution, impose distinctions such as Primary and Backup on the replicas, or count instruction execution between non-deterministic events.

26. A system as recited in claim 21, wherein said functions of said consistent multithreading library, including said means for communicating, and said means for ordering are configured to maintain strong replica consistency, by forcing virtually deterministic execution.

27. A system as recited in claim 26, wherein the threads in said replicas are forced to access the resources that they share in an identical order.

28. A system as recited in claim 26, wherein said strong replica consistency is maintained within client-server systems.

29. A system as recited in claim 26, wherein said strong replica consistency is maintained within fault-tolerant systems.

30. A system as recited in claim 26, wherein for said replicas strong replica consistency is maintained without distinguishing replicas into roles as either Primary or Backup replicas.

31. A system as recited in claim 26, wherein said strong replica consistency is maintained without the need to provide special hardware.

32. A system as recited in claim 26, wherein said strong replica consistency is maintained without the need to perform hardware or software instruction counting between non-deterministic events.

33. A system as recited in claim 26, wherein said strong replica consistency is maintained without modifying either the application source code or the application object code.

34. A system as recited in claim 21, wherein said shared resource comprises memory or an input/output location accessible to the threads of said replica.

35. A system as recited in claim 21, wherein said means for communicating is configured to communicate messages containing shared resource claim information.

36. A system executing a multithreaded application program within a computing environment in which replicas of said program are created using the active replication strategy, comprising:
a computer configured for executing said replicas; and
programming associated with said computer for carrying out the operations of, suspending a thread that claims a shared resource, in response to programming of functions contained in a consistent multithreading library;
communicating the order of the claims of the shared resources by the threads in the replicas, in response to the operation of a multicast group communication protocol; and
granting access to shared resources, and activating suspended threads, in response to said ordering of shared resource claims when said resources are available, in response to resource granting functions; wherein multicasting of a claim request can be suppressed if a given replica has already received the same claim for the same shared resource by the same thread.

37. A system as recited in claim 36, wherein a resource identifier, thread identifier, and claim identifier, are communicated by said multicast group communication protocol.

38. A system as recited in claim 36, wherein said replicated multithreaded program is rendered virtually deterministic in order to maintain strong replica consistency.

39. A system as recited in claim 36, wherein said resource granting functions are executed in conjunction with a consistent multithreading library for controlling access to shared resources.

40. A system as recited in claim 39:
wherein said functions of said consistent multithreading library intercept calls to functions of the operating system's thread library,
wherein strong replica consistency is maintained while said functions of the consistent multithreading library remain transparent to said application program.

41. A system as recited in claim 36, wherein the order in which said multicast protocol delivers messages containing a claim by a given thread for access to a given shared resource for a given claim number, determines the order in which the claims to the shared resource are granted to said threads in said replicas within said computing environment.

42. A system as recited in claim 36, wherein said thread suspension, multicast group communication of claim order, and resource granting functions are invoked by functions of the consistent multithreading library that intercept the functions for claiming and releasing resources provided by the operating system's thread library.

43. A system as recited in claim 36, wherein threads that are not currently claiming the same shared resources are allowed to process concurrently.

44. A system as recited in claim 36, wherein said communication comprises the multicasting of messages containing information, or the writing into shared memory of information, related to the claiming of shared resources.

45. A system for replicating multithreaded application programs on computers within a computing environment, using the active replication strategy to host replicas, comprising:
means for linking with said application program and processing shared resource access requests, as contained within a consistent multithreading library; and
means maintaining an identical order of shared resource access by threads within replicas, thereby providing virtual determinism and strong replica consistency;
wherein said means for maintaining an identical order of resource access is configured for:
multicasting a message identifying resource claims; and
granting claims for resources in response to the order in which messages identifying resource claims are delivered:
wherein said message contains information that identifies the shared resource for which a claim is being made, the thread that is claiming the resource, and the resource claim number of the thread; wherein said granting of claims, in response to the order in which messages containing resource claims are delivered, causes the suspension of threads claiming a shared resource, until said resource is available and any prior claims for that resource have been granted; and
wherein a prior claim for a resource, relative to a specific claim, is a claim contained in a message that is ordered and delivered ahead of the first message that contained said specific claim.

46. A system as recited in claim 45, wherein said computers that host said replicas of said application programs are configured for executing a programming within an environment supporting multithreading, multitasking, distributed computing, fault tolerance, or a client-server paradigm.

47. A system as recited in claim 45, wherein said means for maintaining an identical order of resource access comprises functions of a consistent multithreading library that are executed in response to shared resource access requests and associated operations.

48. A system as recited in claim 47, wherein said functions of said consistent multithreading library are configured as wrapper functions of the functions of the operating system's thread library.

49. A system as recited in claim 48, wherein said functions of said consistent multithreading library are configured to:
communicate shared resource claim information to all of the replicas;
order resource claim information in each replica in response to the order in which shared resource claims are delivered; and
grant shared resource claims in each replica in response to said order, wherein the corresponding threads of the replicas access corresponding shared resources in an identical order.

50. A system as recited in claim 49, wherein said library is configured for maintaining pending claims and ordered claims queues that record the order in which mutexes are claimed, granted and released.

51. A system as recited in claim 47, wherein said wrapper functions of consistent multithreading library intercept calls to the operating system's thread library and execute preceding the execution of functions of the operating system's thread library.

52. A system as recited in claim 51, wherein said consistent multithreading library is configured for being dynamically linked into said application programs.

53. A method of identically ordering accesses to corresponding shared resources by corresponding threads in different replicas of an actively replicated multithreaded application program, comprising:
invoking a claim on a shared resource by a thread in a replica in preparation for accessing said shared resource;
suspending execution of said thread invoking said resource claim;
multicasting a message to communicate information about said resource claim by said thread in said replica to all of the replicas;
ordering and delivering said information about said resource claims by said multicast;
granting access to said resource, when available, to a thread in response to the order in which said information is delivered to the replicas; and
releasing said resource, by said thread granted said resource, after said thread has completed accessing said shared resource.

54. A method as recited in claim 53, wherein access to said shared resource is controlled by a mutual exclusion construct (mutex), to which a claim by a given thread must be granted prior to that thread accessing said shared resource associated with said mutual exclusion construct.

55. A method as recited in claim 54, wherein information about said shared resource claims is recorded in pending claims and ordered claims queues.

56. A method as recited in claim 54, wherein said claim to a mutual exclusion construct is obtained by the steps comprising:
(a) determining (T, M, N) for a claim to a mutual exclusion construct associated with said shared resource, wherein T represents the thread making said claim, M represents the mutual exclusion construct being claimed, and N represents the claim number by thread to any mutex;
(b) determining if (T, N) is the next thread and claim number for which access to the mutual exclusion construct M is to be granted, and if so, the following is performed,
  (i) recording that thread T has been granted its Nth claim,
  (ii) marking said mutual exclusion construct as unavailable,
  (iii) granting said mutual exclusion construct to thread T, and
  (iv) bypassing following steps (c) through (e);
(c) determining that a claim (T, N) has not been delivered, in which case information about the claim is multicast to other replicas;
(d) marking thread T claiming mutual exclusion construct M as suspended; and
(e) suspending thread T.

57. A method as recited in claim 56, wherein said resource releasing comprises:
marking the mutual exclusion construct associated with said resource as available;
selecting the next ordered and delivered but ungranted claim (T', N') for the mutual exclusion construct, wherein T' represents the thread making said resource claim and N' represents the claim number by thread T'; and
signaling thread T' to awaken thread T', if thread T' is suspended.

58. A method as recited in claim 53, wherein said method of identically ordering accesses to shared resources by threads in replicas comprises a consistent multithreading library containing functions that control access to shared resources.

59. A method as recited in claim 58, wherein said consistent multithreading library is interposed ahead of the operating system's thread library and where the functions of the consistent multithreading library wrap the corresponding functions of the operating system's thread library.

60. A method as recited in claim 59, wherein said consistent multithreading library is interposed ahead of the operating system's thread library by dynamic or static linking.

* * * * *